Patented Jan. 20, 1942

2,270,662

UNITED STATES PATENT OFFICE 2,270,662

COATED STEEL ARTICLE

Marion H. Raney, Long Island City, N. Y., assignor to Anchor Hocking Glass Corporation, Lancaster, Ohio, a corporation of Delaware No Drawing. Application January 19, 1939, Serial No. 251,795

6 Claims. (Cl. 91—70)

My invention relates to coated steel articles. It has to do particularly with the coating of that type of steel which is known generally as black plate.

Some suggestions have been made by prior art workers looking towards the application of synthetic resins to black plate. However, in the main, these suggestions have contemplated fabrication of the metal first, followed by a preliminary treatment of the metal, usually with phosphoric acid and in some cases by electrolytically phosphatizing the surfaces of the steel preliminarily to the application of the resin film. The step of phosphatizing the surface is a relatively costly one. Furthermore, the films applied have been admittedly of such a nature that the steel article to which they are intended to be applied must first be fabricated to final form, apparently because their adherence to the metal would be inadequate to resist fabrications such as stamping, drawing, forming, or the like.

In the prior art, the most commonly used method of protecting steel of the type in question has been to coat the steel with tin. The tin is relatively costly. Furthermore, it leaves something to be desired from the standpoint of resistance to corrosion, particularly by acid and alkali. Thus, certain acids and alkalis have a direct corroding effect upon tin plate, and when a fracture occurs in the tin plate, the corrosion spreads underneath the tin surrounding the fracture. Some effort has been made to guard against these drawbacks and also to prevent contamination of food products by applying a resinous primer coat to the tin plate and thereafter applying a vinyl resin on top of such primer coating. However, these efforts obviously involve increased expense.

One of the objects of my invention is to provide an article of black iron or the like, having applied thereon a resin film having such adherence to the metal and such inherent flexibility that the thus coated article can be fabricated without material injury to the film and without destroying the adhesion of the film to the metal.

Another object of this invention is to provide an article of black plate or black iron having a resinous film thereon which, in appearance, somewhat simulates the appearance of tin plating both in general color and glossy characteristics.

Another object of this invention is to provide a method of applying a resinous film to black plate or black iron which will be relatively simple and economical and which will insure that the film will adhere to the plate or iron during subsequent fabricating processes such as stamping, drawing or otherwise forming.

Another object of this invention is to provide a composition containing resinous material which will be adequately resistant to corrosion by acids, alkalies, alcohol or water which will be adequately flexible to permit of considerable distortion and which may be caused to adhere firmly to black iron or black plate during subsequent fabrication of the steel with such film applied thereto.

Another object of this invention is to provide a cap or closure for containers formed of black plate or black iron and having directly applied thereto a resinous film which will be adequately tough and adherent as well as being adequately resistant to corrosion by acids, alkalies, alcohol, or water.

In the making of my coated steel article, I take the ordinary black iron which is generally referred to as black plate while it is in a flat state or I may take any low carbon steel in a flat state and first subject it to a solvent which will be adequate to remove any oil or other extraneous matter from the surface thereof. Then, I apply my resinous composition to the iron or steel by any well-known method of applying varnishes as by roller coating, spraying, flowing or brushing. Immediately after application of the resinous film to the iron or steel, the coated article is subjected to a baking operation. The baking temperature is preferably about 400° Fahrenheit, though it is within the scope of my invention to utilize baking temperatures ranging from 350° to 450° Fahrenheit.

Though I have utilized the term "baking" in describing the heat treatment of my coated steel article, the operation is not strictly a baking operation. The effect of the heat application is to first volatilize the solvent. After this is effected, the continued application of the heat brings about a partial fusion of the coating with the result that its adherence to the steel is greatly improved.

The resinous composition which I utilize may take various forms. However, I have found that certain resins when combined are particularly desirable in providing a corrosion resistant film of adequate toughness and adhering qualities to permit of subsequent fabrication of the coated iron or steel article without rupture or detachment of the film from the iron or steel. My composition also preferably contains a metallic powder, present in such proportions as to impart to the film a comparatively bright, reflective surface. Likewise, my composition preferably contains certain materials which serve as stabilizers and certain materials which serve as plasticizers, as well as certain solvents and diluents, the nature of which will subsequently appear.

One of the resins which I preferably use in my composition is a co-polymer of vinyl acetate and vinyl chloride. One such co-polymer that I have found to be satisfactory is that known as "vinylite H" which contains about 87% vinyl chloride and 13% vinyl acetate. Other polyvinyl resins, such as vinyl acetate or any of the vinyl halides may be used instead of or together with the co-polymers of vinyl acetate and vinyl chloride. If the co-polymer of vinyl acetate and vinyl chloride is combined with one or more of the polyvinyl resins, the relative proportions may be varied to obtain the desired qualities of corrosion resistance, softness and toughness.

The polyvinyl resins, together or alone, suffer from lack of adhering qualities adequate to insure that they will remain adherent to the iron or steel during fabrication process. However, I have found that this draw-back is overcome when they are supplemented with proper percentages of a phenolic resin. My tests show that phenolic resin serves as a stabilizer for the vinyl resin with the result that the combined resins may be heated higher than the vinyl resins alone without decomposition that is normally characteristic of vinyl resins at high temperatures, particularly, when they are in contact with metal. For example, I have utilized a phenol aldehyde resin in combination with a co-polymer of vinyl acetate and vinyl chloride and have been able to produce a resinous composition which is adequately resistant to corrosion by acids, alkalies, alcohol or water which has adequate toughness and flexibility and which is adequately resistant to detachment from the iron to which it is applied to permit of fabrication of the iron, as in the formation of caps or closures for containers. The addition of the phenol aldehyde increases the hardness of the composition and also improves the adhering qualities thereof.

In some cases, although not in all, some form of stabilizer is desirable to prevent disintegration of the vinyl resin in contact with the iron during subjection to high-baking temperatures. These stabilizers may take various forms. They may be metallic oxides, carbonates and hydrates and metals such as lead, antimony and titanium. They may take the form of compounds such as the amines.

My composition also preferably contains one or more plasticizers. The plasticizer which I preferably use is acetylated castor oil. However, I may use either dibutyl phthalate, dimethyl phthalate, diphenyl phthalate, triphenyl phosphate, butyl - phthalyl - butyl - glycollate, ethylphthalyl-ethyl glycollate, cyclohexyl para-toluene sulfonamide, dibutyl Cellosolve phthalate.

The solvents which I use may take various forms. These forms include ketones, certain esters, chlorinated hydro-carbons and polyethers. Various diluents may be suitable, such as coal tar solvents or hydrogenated naphthas. One solvent that I have used is methylisobutyl ketone. As diluents I have utilized toluol and xylol. I have used diacetone alcohol although this may not be necessary.

The metal powder which I preferably use for the purpose of enhancing the reflectivity and the metallic appearance of my resin-covered iron is aluminum powder. The aluminum powder is not present in sufficient quantities to cause it to serve as a pigment and it is not desirable that it be present in such quantity. The aluminum powder and, in fact, any metallic powder which might be used will, if present in too large quantities, tend to decrease the toughness, flexibility and adhering qualities of the resinous film. Other powders which I may use as a substitute for aluminum powder are antimony, tin, lead and, possibly, cadmium, nickel, copper, copper alloys and alloys of white metals. As a matter of fact, the use of any bright metal powder for this purpose falls within the scope of my invention.

When using a composition containing the co-polymer of vinyl acetate and vinyl chloride together with a phenol aldehyde resin I prefer to use the various ingredients of the composition in the following percentage range:

|  | Per cent |
|---|---|
| Co-polymer of vinyl acetate and vinyl chloride | 8 to 15 |
| Phenol-aldehyde resin | 4 to 8 |
| Plasticizer | 3 to 6 |
| Solvent (ketone) | 30 to 45 |
| Diluent: | |
| Toluol | 18 to 35 |
| Xylol | 8 to 15 |
| Diacetone alcohol | Up to 10 |
| Metallic element (aluminum) | 2 to 6 |
| Stabilizer | 5 to 25 |

I have made a number of accelerated corrosion tests to determine the effectiveness of my resinous film on black iron in comparison with the effectiveness of tin on black iron. For example, I have coated flat sheets of black iron for forming caps or closures for containers with a resinous film of the following composition:

|  | Per cent |
|---|---|
| Co-polymer vinyl chloride and vinyl acetate resin | 10 |
| Phenol aldehyde resin | 5 |
| Antimony oxide | 15 |
| Plasticizer | 6 |
| Aluminum powder | 2 |
| Methyl isobutyl ketone | 30 |
| Toluol | 22 |
| Xylol | 10 |

This film was applied to flat black iron plate before fabrication into cap form. After the cap had been fabricated, it was subjected to the following accelerated corrosion tests in comparison with identical tests of caps fabricated from tin plate: Comparative tests were made using 10% acetic acid solution. These tests were examined periodically and were continued for a period of one week continuous exposure. The tin plate showed almost immediate attack of both the tin coating and the base iron which was exposed by fractures in the tin coating occurring in fabrication. As the tests progressed, the corrosion occurring at the points of fracture of the tin coating rapidly spread through the iron beneath the tin coating until finally heavy corrosion resulted over the entire surface.

Caps made from black iron coated with my resinous film of the composition indicated immediately above when exposed to the same test with 10% acetic acid showed no immediate corrosion on any part of the surface. Upon prolonged exposure, small points of corrosion appeared where the film was weakened in fabrication. The area of corrosion at the weakened point was far less than that shown on the caps made of tin plate, and the corrosion did not spread around these areas such as occurred on the caps made of tin plates so that at the conclusion of the test, the black iron coated with my resinous coating showed far less corroded area than did the caps made of tin plate exposed to the same test.

Tests were also made exposing caps made from black iron coated with my resinous film in comparison with caps made from tin plate with 5% hydrochloric acid solution for a period of one week. In this test, caps made from black iron coated with my resinous film showed up to even better advantage in comparison with caps made of tin plate than in the tests mentioned immediately above due to the fact that hydrochloric acid attacks tin much more readily than does acetic acid whereas, at the same time, it shows no attack against my resinous film. Consequently, in this test, caps made from tin plate quickly show heavy corrosion over the entire surface, whereas caps made from black iron coated with my resinous film show only small areas of corrosion and only after prolonged exposure where the resinous film may be weakened in fabrication.

Comparative tests were also made exposing caps made from black iron coated with my resinous film and caps made from tin plate against 5% sodium hydroxide solution which is a strongly alkaline and caustic solution. These tests were continued for a period of one week. The caps made from tin plate showed corrosion over the entire surface and particularly heavy corrosion where the tin coating had been fractured in fabrication. On the caps made from black iron, coated with my resinous film, corrosion appeared only after prolonged exposure and only at slight areas where the film may have been weakened in fabrication.

I have given above the preferred composition of my resinous coating. However, it is within the scope of my invention to form my resinous coating of 8 to 22% of any polyvinyl resin, 2 to 15% of any phenolic resin. It is possible that plasticizers and stabilizers may not be necessary. If necessary, however, I may use up to 10% of any plasticizer and up to 25% of any stabilizer. Likewise, the solvent used may be of any type commonly known in the art and may be used in percentages ranging from 25 to 50%. The diluents may also vary in percentage, ranging anywhere from 30 to 60%. Various metallic powders are used in percentages ranging up to 10%, though under some circumstances, my composition may be advantageous when used without any metallic powder at all.

It will be seen from the above that my invention makes possible the use of black plate or black iron in many of the fields in which tin plate is now commonly used. My resinous film can be applied to the flat plate at a much lower cost than tin. What is even more important is that the flat plate can be fabricated after the resinous film has been applied thereto. Thus, caps or closures for containers or other articles can be formed by stamping, drawing or like processes applied to a flat black iron sheet which has been previously coated with my resinous film and the film will not be materially damaged and will not be detached from the metal by such process.

Black plate coated with my film is more resistant to corrosion than black plate coated with tin. The film itself is more resistant to corrosion with all acids and alkalides with which I am familiar. In addition, the presence of the metallic powder in my composition results in a lustrous surface which has a reflectivity somewhat comparable to tin in appearance. Various other advantages will appear from the above description and from the appended claims.

It should be understood that my resinous film is normally not intended to replace the varnishes or lacquers which are commonly applied to plate but it is designed for the purpose of replacing the tin of tin plate. Therefore, it will in all probability be desirable to utilize varnishes or lacquers on top of my resinous film in practically all cases where varnishes or lacquers would be used upon tin plate or similar surfaces. These varnishes or lacquers may take various forms. They may be oil base coatings or synthetic resin coatings. They may be transparent or may carry pigments.

Where I have referred to black iron or black iron plate in the appended claims, it will be understood that I intend to include practically any plain carbon steel.

Having thus described my invention, what I claim is:

1. An article of manufacture comprising ferrous metal in sheet form and a coating adhering directly to the bare metal, said coating comprising as essential film-forming ingredients an intimate mixture of a vinyl resin and a phenol aldehyde resin, and being resistant to corrosion, flexible, tough and sufficiently adherent to the iron to permit fabrication of the coated sheet.

2. An article of manufacture according to claim 1 wherein the vinyl resin is the co-polymer of a vinyl halide and a vinyl ester with the vinyl halide as the major constituent.

3. An article of manufacturing according to claim 1 wherein the mixture also contains a plasticizer and a metal powder.

4. The method of forming coated shaped articles from ferrous sheet metal, which comprises applying directly to the bare ferrous sheet metal a coating composition containing as essential film-forming ingredients an intimate mixture of a vinyl resin and a phenol aldehyde resin, baking the coating composition, and forming the coated sheet metal into a shaped article of the desired form.

5. A method according to claim 4 wherein the vinyl resin is the co-polymer of a vinyl halide and a vinyl ester with the vinyl halide as the major constituent.

6. A method according to claim 4 wherein the mixture also contains a plasticizer and a metal powder.

MARION H. RANEY.